United States Patent [19]

Udagawa et al.

[11] 4,302,251

[45] Nov. 24, 1981

[54] CEMENT COMPOSITION CONTAINING DEXTRIN

[75] Inventors: Hideyuki Udagawa, Kawasaki; Tetsuya Ando, Tokyo; Iwao Kibayashi, Machida, all of Japan

[73] Assignee: Denki Kagaku Kogyo Kabushiki Kaisha, Tokyo, Japan

[21] Appl. No.: 97,465

[22] Filed: Nov. 26, 1979

[30] Foreign Application Priority Data

Nov. 29, 1978 [JP] Japan ............................ 53/146451
Nov. 29, 1978 [JP] Japan ............................ 53/146452
Nov. 29, 1978 [JP] Japan ............................ 53/146453

[51] Int. Cl.$^3$ ............................................ C04B 7/352
[52] U.S. Cl. ................................................... 106/92
[58] Field of Search ...................................... 106/92

[56] References Cited

U.S. PATENT DOCUMENTS

| | | | |
|---|---|---|---|
| 2,374,628 | 4/1945 | Swayze | 106/92 |
| 2,576,955 | 12/1951 | Ludwig | 106/92 |
| 2,648,645 | 8/1953 | Boris et al. | 106/92 |
| 3,414,420 | 12/1968 | Maravilla et al. | 106/92 |
| 3,486,960 | 12/1969 | Fitzgerald et al. | 106/92 |
| 3,885,985 | 5/1975 | Serafin et al. | 106/92 |
| 3,954,489 | 5/1976 | Uchikawa et al. | 106/92 |
| 4,137,093 | 1/1979 | Poblano | 106/92 |

*Primary Examiner*—James Poer
*Attorney, Agent, or Firm*—Jordan and Hamburg

[57] ABSTRACT

A cement composition is provided which comprises a cement, and 0.1 to 2.5% by weight, based on the weight of said cement, of a dextrin having a cold-water solubility of from 10 to 80% by weight. The cement composition of the invention suppresses heat of hydration, so that the cement mortar or concrete do not crack due to the heat of hydration.

12 Claims, 6 Drawing Figures

CEMENT COMPOSITION CONTAINING DEXTRIN

BACKGROUND OF THE INVENTION

1. Field of the Invention

The present invention relates to a cement composition containing dextrin, and more particularly to a cement composition containing dextrin which suppresses the temperature rise of concrete and mortar due to the heat of hydration.

2. Prior Art

In recent years, civil engineering and building constructions are enlarged in scale with attendant increase in mass concrete works. Generation and accumulation of heat due to hydration of cement is increased with the increase in size of the constructed mass so that the temperature of the cement mortar or concrete is abruptly raised particularly at the initial stage of ageing to cause internal stresses after cooling to thereby create a so-called thermal cracking problem in the finished mortar or concrete. Such thermal cracking problem is caused when a normal cement is used, and the tendency to create this thermal cracking problem is further promoted when there is used an expansive cement which has been conventionally employed for compensating dry shrinkage or for realizing a special effect in the chemical pre-stressing process, since the hydration reaction of the expansive cement is accelerated as compared to that of the normal cement.

Anyway, this thermal cracking problem may be prevented, for example, by the following measures:

(1) The amount of a cement mixed in the unit volume of the concrete or mortar is decreased.

(2) A cement which generates a smaller quantity of heat of hydration is selected.

(3) Pre-cooling or pipe cooling is effected.

(4) The quantity of concrete or mortar charged at every unit operation is lessened.

(5) Shrinkage joints are provided.

(6) Ageing is strictly controlled.

However, difficulties are encountered to effectuate the aforementioned measures in the practical construction works due to various limitations. Under these circumstances, it is a conventional practice to add a small amount of an additive such as an additive mainly composed of a lignin sulfonate, an additive mainly composed of an oxycarboxylate or sugar. However, it as been difficult to suppress the temperature rise in the molded bodies at the early ageing stage and to prevent the thermal cracking by means of the prior art additives mentioned above, since an abrupt hydration reaction takes place after a certain delay in commencement of the hydration reaction, neverthless they are effectively used for retarding the commencement of the hydration reaction.

In the meanwhile, the concept of adding dextrin to cements has been known in itself, for example from the disclosure of U.S. Pat. No. 3,414,420. This U.S. Patent discloses a retarded oil well cement used for a special application, which comprises an oil well Portland cement admixed with a retarder consisting of 1 to 8 parts by weight of a modified starch to 1 part by weight of dextrin. Namely, dextrin is used together with a special starch to retard the setting of the cement. However, this U.S. Patent neither discloses nor suggests the cement composition of the present invention containing a specified amount of dextrin having a cold-water solubility within the range as described hereinafter and defined in the appended claims so as to suppress the temperature raise at the early ageing stage thereby to prevent the thermal cracking.

U.S. Pat. No. 3,486,960 discloses a method of coating a substrate with tile wherein the tile is adhered to the substrate in spaced edge to edge relationship, the improvement comprising filling the spaces between the tiles with an adhesive grout prepared by mixing with water a dry composition comprising hydraulic cement and non-ionic dextrin. This method is directed to a method of setting tiles using a cement composition containing non-toxic dextrin for providing water-retentivity, and also fails to disclose or suggest the cement composition of the present invention containing a specified amount of dextrin having a cold-water solubility within the range as as set forth above similarly as the U.S. Patent referred to formerly.

OBJECTS AND SUMMARY OF THE INVENTION

An object of the present invention is to provide a cement composition wherein the heat generated by the exothermic hydration reaction of cement is suppressed to thereby prevent the cement mortar or concrete from thermal cracking.

Another object of the present invention is to provide a cement composition which has high resistivity against thermal cracking and which is excellent in strengths at the early stage as well as at the later stage.

A further object of the present invention is to provide a cement composition which has high resistivity against thermal cracking and which is improved in water reducing property.

The above and other objects and advantages of the invention will become apparent from the following description.

A cement composition according to the present invention comprises a cement and 0.1 to 2.5% by weight, based on the weight of said cement, of a dextrin having a cold-water solubility of from 10 to 80% by weight.

DESCRIPTION OF THE INVENTION

Figure 1:
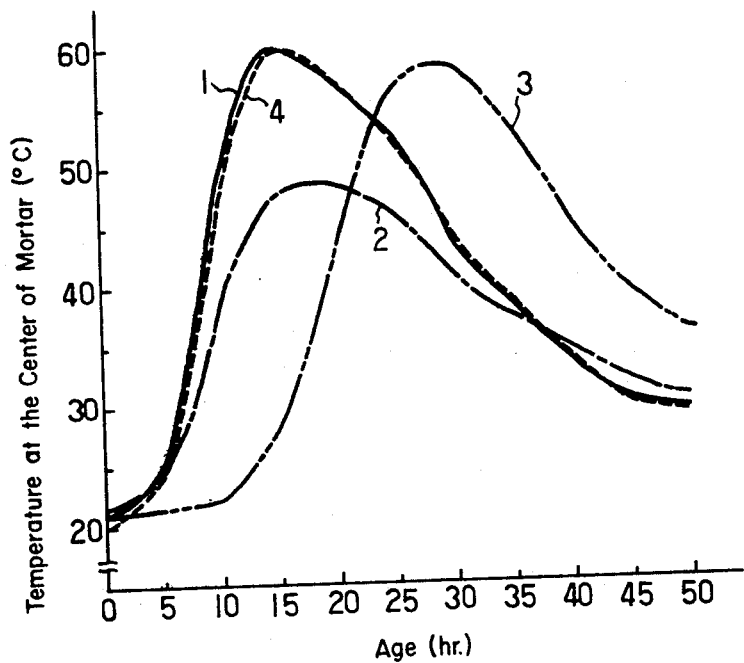
FIG. 1 is a graph showing the interrelation between the age and the temperature of the substantial center of a molded cement mortar.

The dextrin contained in the cement composition according to the present invention shall have a cold-water solubility of from 10 to 80%, preferably 10 to 65%, by weight. If the content of the cold-water soluble components is decreased to a level lower than 10% by weight, the advantageous effect of suppressing the temperature rise due to the heat of hydration cannot be realized, the strengths at the early and later stages are not increased and the water reducing property of the resultant product becomes inferior, as well. On the contrary, if the content of cold-water soluble components exceeds 80% by weight, the dextrin will act only as a retarder, namely it only retards the generation of the heat of hydration only at the early stage so that the temperature of the cement is abruptly raised after the lapse of about 30 hours and thus deprived of its resistivity against thermal cracking.

The wordings of "the cold-water soluble content of dextrin" or "the cold-water solubility" used throughout the specification and claims mean the amount of the components in the tested dextrin dissolved in distilled water at 21° C. More specifically, the cold-water soluble content is determined by putting 10 g of dextrin in a 200 ml messflask, adding 150 ml of distilled water at 21° C., filtering after allowing to stand for an hour at 20° to 23° C. and then evaporating the water in the filtrate to dryness to measure the weight of the once dissolved dextrin, from which the ratio of the cold-water soluble content is calculated.

In accordance with the present invention, the dextrin having the cold-water solubility as mentioned hereinabove shall be contained in an amount of 0.1 to 2.5% preferably 0.2 to 2.0%, by weight based on the cement. If the added amount of dextrin is short of 0.1% by weight, the effect of suppressing the temperature rise due to the heat of hydration cannot be realized and the strength is not increased so much. On the contrary, if the added amount of dextrin exceeds 2.5% by weight, the creation of strength is retarded too much and the strength thus created does not reach a higher level although the effect of suppressing the temperature rise is realized.

The dextrin used in the present invention may be prepared by any methods, provided that the resultant dextrin has the cold-water solubility as defined hereinabove. It may be prepared, for example, by adding a dilute acid to a dextrin to thermally decompose the latter, by decomposing a dextrin with an enzyme or by condensating glucose.

The cements used in the present invention include various Portland cements such as normal Portland cement, high early strength Portland cement, super high early strength Portland cement, moderate heat Portland cement, white Portland cement or the like; mixed cements such as silica cement, fly ash cement, blast furnace cement or the like; expansive cements containing, as a main expansive agent, a combination of calcium sulfoaluminate, lime and calcium sulfate, a combination of calcium aluminate and calcium sulfate, a high sulfate slag, lime, MgO or the like; and rapid hardening cements containing calcium aluminate such as $12CaO \cdot 7Al_2O_3$ and/or calcium haloaluminate such as $11CaO \cdot 7Al_2O_3 \cdot CaX_2$ (wherein X is a halogen) together with calcium sulfate or the like.

In the present invention, a surface active agent may be added to the cement composition containing the above-specified dextrin, such surface active agents being a water reducing agent, an air entraining water reducing agent and an air entraining agent. It is preferred that any of such surface active agents be used together with the dextrin, since the effect of suppressing the temperature raise can be improved more remarkably and other physical properties of the cement, such as workability, may be improved. The water reducing agents which may be used in the cement composition according to the present invention, include those mainly composed of any of a polysaccharide, an oxycarboxylate, a polyalkylaryl sulfonate, a polycondensation product of triazine modified with an alkali metal salt of sulfurous acid. The air entraining water reducing agents include those mainly composed of any of lignin sulfonate, creosote oil-formaldehyde condensate modified with a metal salt of sulfurous acid, a metal salt of naphthalene sulfurous acid-formaldehyde condensate and polyoxyethylene alkylaryl ether. The air entraining agents include those mainly composed of sodium abietate and those mainly composed of a triethanolammonium hydrocarbon sulfonate, and specific examples of commercially available air entraining agents are sold under the Trade Names of "Vinsol" (produced by Yamaso Chemicals Co., Ltd.) and "Darex" (produced by W. R. Grace Co., Ltd.) Particularly preferred surface active agents are those mainly composed of polyalkylaryl sulfonates including $\beta$-naphthalene sulfonic acid formalin condensate and those mainly composed of lignin sulfonate or sodium abietate, since the temperature suppressing effect in combination with said dextrin is most intensive. The specific kind and the amount of the surface active agent added to the weight of cement may be selected generally within the range of less than 1% by weight depending on the desired property.

A retarder may also be added to the cement composition of the present invention. The retarders which may be used in the cement composition of the invention include carbohydrates such as glucose, fructose, galactose, sucrose, lactose, cellulose and derivatives thereof; high molecular weight organic acids such as lignin, derivatives of lignin and salts thereof and tannic acid; carboxylic acids and salts thereof such as lactic acid, acetic acid, malic acid, maleic acid and salts thereof; lower and higher alcohols; and inorganic acids and salts thereof such as phosphoric acid, boric acid, and carbonic acid and salts thereof such as phosphates and silicofluorides. By adding a retarder to the cement composition containing the dextrin according to the present invention, the temperature raise of the molded body after the hydration retarding period may be suppressed and the thermal cracking may be prevented. The added amount of the retarder may be generally less than 3% by weight based on the weight of the cement.

The cement composition containing the dextrin according to the invention may be used also as a grout composition. The grout composition comprises cements admixed with one or more of the materials selected from the group consisting of water glass, asphalt emulsions, cement expansive agents, cement rapid hardening agents, bentonite and mixtures of iron powders and oxidizing agents, said materials being selected depending on the applied uses.

As has been described above, according to the present invention, by adding the specified amount of dextrin having a cold-water solubility as defined hereinbefore to a variety of Portland cements and mixed cements, it makes possible to control the heat of hydration, to provide the water reducing property and to improve the development of strengths. Besides, if the aforementioned dextrin is added to an expansive cement, the cement is provided with said advantageous functions while retaining the inherent properties thereof. Also, when the aforementioned dextrin is added to a rapid hardening cement, the cement is provided with said advantageous functions similarly without losing its inherent properties. Furthermore, if any of said surface active agents is used together, the effect of suppressing the temperature raise will be marvelous. It is, of course, possible to use a retarder together.

Some preferred examples of the present invention will be described below, but it should be noted that it is not intended to restrict the present invention by the following examples in any sense.

In Table 3, there are also shown the results of the compressive strength test conducted similarly as in the preceding experiments using the mortar test specimens of 4 cm×4 cm×16 cm after cured in water at 20° C., and the data of table flow values determined generally in accordance with the JIS-R5201 method (JIS means Japanese Industrial Standard.)

TABLE 1

| Experiment No. | Added Quantity (part) | Age (hr.) | | | | | | | | | | |
|---|---|---|---|---|---|---|---|---|---|---|---|---|
| | | 0 | 5 | 10 | 15 | 20 | 25 | 30 | 35 | 40 | 45 | 50 |
| | | (Unit: °C.) | | | | | | | | | | |
| 1 | Not Added | 21.0 | 25.0 | 49.0 | 59.8 | 57.1 | 52.6 | 43.6 | 38.3 | 33.5 | 30.1 | 29.2 |
| 2 | Dextrin 0.4 (Cold-water Solubility: 18.3 wt %) | 21.5 | 24.5 | 38.2 | 47.5 | 48.4 | 46.0 | 40.9 | 37.2 | 34.5 | 31.8 | 30.4 |
| 3 | Dextrin 0.4 (Cold-water Solubility: 85 wt %) | 21.0 | 21.5 | 22.2 | 28.1 | 42.9 | 56.3 | 58.0 | 53.1 | 45.2 | 39.3 | 36.1 |
| 4 | Dextrin 0.4 (Cold-water Solubility: 8 wt %) | 20.0 | 24.5 | 46.3 | 59.8 | 57.4 | 52.4 | 44.2 | 38.6 | 33.7 | 30.0 | 29.0 |

EXAMPLES OF THE INVENTION

Example 1

A mortar composed of 100 parts by weight of a normal Portland cement, 200 parts by weight of a river sand having a particle size of less than 5 mm and picked up from the beach of Sagami River and each of the parts by weight of dextrins having cold-water solubilities respectively as set forth in Table 1, which mortar had a water-cement ratio of 42% and was adjusted to a temperature of 20° C. after kneading, was put into a cylindrical container made of a foamed polystyrene and having a height of 30 cm, an inner diameter of 13 cm and a thickness of 10 cm and aged in a constant temperature chamber maintained at 20° C., and the temperature at the substantial center portion of the mortar was measured by a thermo-couple continuously and automatically. The results are shown in Table 1 and FIG. 1.

The same mortar was molded in a mold of 4 cm×4 cm×16 cm dimensions to form test specimens which were cured in water at 20° C. and then subjected to a compressive strength heat. The results are shown in Table 2.

Further experiments were conducted similarly as in the preceding experiment except in that a variety of dextrins having cold-water solubilities as set forth in Table 3 were added. Similarly, the temperature at the substantial center portion of each mortar was measured. The maximum temperatures thus determined and the ages at which each mortar reached said maximum temperature are shown in Table 3 together with the test results of the preceding experiments.

TABLE 2

| | | Experiment No. | | | |
|---|---|---|---|---|---|
| | | 1 | 2 | 3 | 4 |
| Compressive Strength (Kg/cm²) | 7 Days | 461 | 487 | 415 | 468 |
| | 28 Days | 572 | 598 | 576 | 562 |

TABLE 3

| | | Experiment No. | | | | | | | |
|---|---|---|---|---|---|---|---|---|---|
| | | 1* | 4* | 5 | 2* | 6 | 7 | 8 | 3* |
| Cold-water Solubility of Dextrin (wt %) | | Not Added | 8 | 10 | 18.3 | 60 | 65 | 80 | 85 |
| Maximum Temp. and Age | Temp. (°C.) | 59.9 | 59.8 | 52.3 | 48.4 | 48.0 | 48.0 | 51.6 | 58.0 |
| | Age (hr.) | 15 | 15 | 18 | 20 | 23 | 23 | 27 | 30 |
| Compressive Strength (kg/cm²) | Age 7 Days | 461 | 468 | 478 | 487 | 470 | 469 | 468 | 415 |
| | 28 Days | 572 | 562 | 583 | 598 | 582 | 582 | 576 | 576 |
| Table Flow (mm) | | 211 | 213 | 223 | 231 | 236 | 237 | 240 | 240 |

Note:
(1) Numbers attached with * indicate the Experiment Nos. shown in Table 1.
(2) The added quantities of dextrin in Experiment Nos. 5, 6, 7 and 8 are, respectively, 0.4 parts by weight similarly as in the preceding Experiments.

From the test data given above, it will be understood that the maximum temperature in Experiment Nos. 2, 5, 6, 7, and 8 was about 52° C. at highest, whereas the maximum compressive strength reached 598 kg/cm² and the table flow values were also increased to show improved water reducing properties. On the contrary, in the comparative Experiment Nos. 1 and 4 wherein no dextrin was added or the cold-water solubility was in short of 10% by weight, the temperature reached so high as 59.8° C., showing poor temperature suppressing effect and the compressive strength was not increased, either. On the other hand, if the cold-water solubility was in excess of 80% by weight as in comparative Experiment No. 3, the added dextrin acted only as a retarder and did not exert the temperature suppressing effect at the later stage such that the maximum temperature at the substantial center of the mortar at the age of 30 hours reached so high as 58° C.

Example 2

A concrete was prepared by mixing 100 parts by weight of a normal Portland cement, 352 parts by weight of a coarse aggregate consisting of a river gravel picked up from the beach of Sagami River and 255 parts by weight of a fine aggregate consisting of a river sand having a particle size of less than 5 mm and picked up from the beach of Sagami River with water to bring the water-cement ratio of 56% and further added the dextrin according to the present invention. The concrete was kneaded and then adjusted to a temperature of 20° C. after kneading. The concrete was then casted into an iron mold frame of 50 cm×50 cm×50 cm in dimension which was enclosed with a 10 cm thick foamed polystyrene on its four faces while the residing two faces being left opened, and the temperature at the substantial center portion of the concrete during the curing at 20° C. in a constant temperature chamber was measured by a thermocouple automatically.

Figure 2:
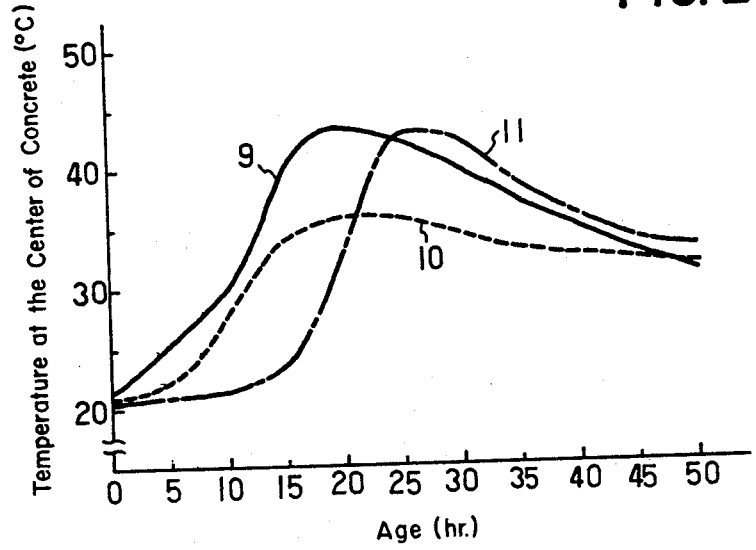
FIG. 2 is a graph showing the interrelation between the age and the temperature at the substantial center of a molded cement concrete.

For the comparison purpose, similar tests were conducted on the concretes, respectively, added with gluconic acid and no additive. The results are shown in Table 4 and FIG. 2.

Figure 3:
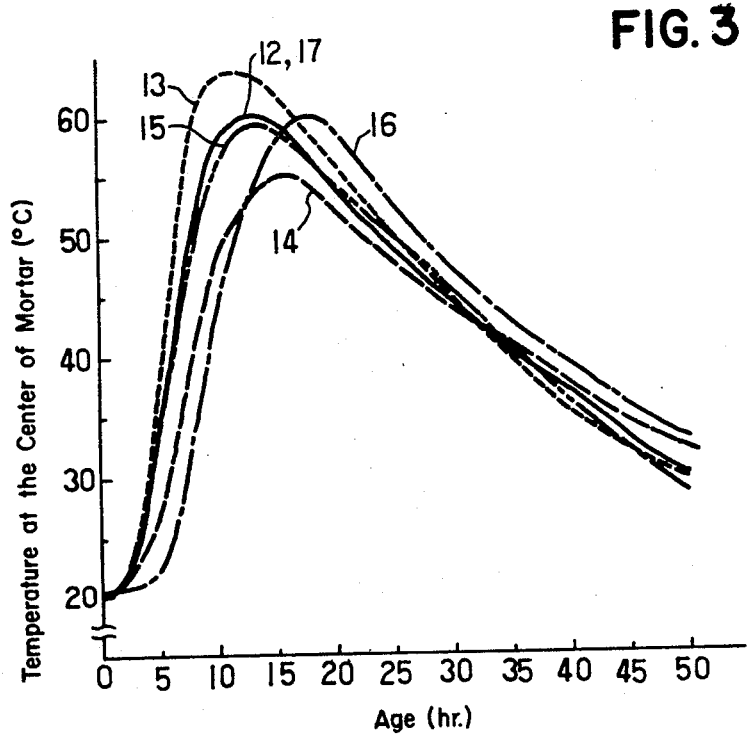
FIG. 3 is a graph similar to that shown in FIG. 1 showing the case of an expansive cement.

42 parts by weight of water and 0.6 parts by weight of dextrin was prepared, and adjusted the water-cement ratio thereof to 42% and the temperature after kneading to 20° C. About 3.5 l of the thus prepared mortar was casted into a cylindrical container made of a foamed polystyrene and having a height of 30 cm, an inner diameter of 13 cm and a thickness of 10 cm, and cured at 20° C. in a constant temperature chamber. The temperature at the substantial center of the motar during the curing period was automatically measured using a thermo-couple. The specific kinds of the cement expansive agent and dextrins used and the test results are shown in Table 5 and FIG. 3.

There are also shown the results of the compressive strength tests conducted on the test specimens of 4 cm×4 cm×16 cm in dimension which were cured at 20° C. in water.

Similar tests were conducted on the motar used in Experiment No. 14 while changing the amount of the dextrins. The results thus obtained are shown in Table 6.

Example 3

A mortar composed of 90 parts by weight of a normal Portland cement, 10 parts by weight of each of the commercially available cement expansive agents as set forth in Table 5, 200 parts by weight of a natural sand,

TABLE 4

| Experiment No. | Material Added (part) | Age (hr.) | | | | | | | | | | |
|---|---|---|---|---|---|---|---|---|---|---|---|---|
| | | 0 | 5 | 10 | 15 | 20 | 25 | 30 | 35 | 40 | 45 | 50 |
| | | (Unit: °C.) | | | | | | | | | | |
| 9 | Not Added | 21.5 | 25.2 | 29.8 | 40.0 | 43.3 | 42.0 | 39.6 | 37.0 | 34.7 | 32.6 | 30.9 |
| 10 | Dextrin 0.4 (Cold-water Solubility: 18.3 wt %) | 21.0 | 22.3 | 27.8 | 34.0 | 35.9 | 35.7 | 34.3 | 33.0 | 32.5 | 32.0 | 31.5 |
| 11 | Gluconic Acid 0.15 | 20.7 | 20.9 | 21.3 | 23.5 | 33.2 | 42.7 | 42.2 | 38.4 | 35.9 | 33.6 | 33.0 |

TABLE 5

| Exp. No. | Material Added | Temperature at the Substantial Center of the Mortar at Respective Ages (hour) (°C.) | | | | | | |
|---|---|---|---|---|---|---|---|---|
| | | 0 | 5 | 10 | 15 | 20 | 25 | 30 |
| 12 | Expansive Agent Mainly Composed of Calcium Sulfoaluminate (Sold under the Trade Name of "DENKA CSA" from Denki Kagaku Kogyo KK) Dextrin Not Added | 20.1 | 33.2 | 57.8 | 59.5 | 54.2 | 49.0 | 44.6 |
| 13 | Expansive Agent Mainly Composed of Lime (Sold under the Trade Name of "EXPAN" from Onoda Cement Co., Ltd.) Dextrin Not Added | 20.0 | 38.1 | 63.2 | 62.0 | 56.3 | 50.3 | 45.0 |
| 14 | Expansive Agent Used in Experiment No. 12 Dextrin Having Cold-water Solubility of 18.3 wt % | 20.2 | 27.2 | 48.0 | 55.2 | 52.2 | 47.8 | 44.0 |
| 15 | Expansive Agent Used in Experiment No. 13 Dextrin Same as that Used in Experiment No. 14. | 20.0 | 33.2 | 55.8 | 59.0 | 54.5 | 50.0 | 45.3 |
| 16 | Expansive Agent Used in Experiment No. 12 Dextrin Having Cold Water Solubility of 95 wt % | 20.3 | 22.2 | 43.8 | 57.8 | 59.0 | 52.5 | 47.2 |
| 17 | Expansive Agent Used in Experiment No. 12 Dextrin Having Cold-water Solubility of 0 wt % | 20.0 | 33.3 | 57.8 | 59.5 | 54.1 | 48.8 | 44.5 |

| Exp. No. | Material Added | Temperature at the Substantial Center of the Mortar at Respective Ages (hour) (°C.) | | | | Compressive Strength (kg/cm²) | |
|---|---|---|---|---|---|---|---|
| | | 35 | 40 | 45 | 50 | 7 days | 28 days |
| 12 | Expansive Agent Mainly Composed of Calcium Sulfoaluminate (Sold under the Trade Name of "DENKA CSA" from Denki Kagaku Kogyo KK) Dextrin Not Added | 40.2 | 37.0 | 33.1 | 30.1 | 440 | 581 |
| 13 | Expansive Agent Mainly Composed of Lime (Sold under the Trade Name of "EXPAN" from Onoda Cement Co., Ltd.) Dextrin Not Added | 39.8 | 35.3 | 32.1 | 29.8 | 432 | 573 |
| 14 | Expansive Agent Used in Experiment No. 12 | | | | | | |

TABLE 5-continued

| | | | | | | | |
|---|---|---|---|---|---|---|---|
| | Dextrin Having Cold-water Solubility of 18.3 wt % | 41.0 | 37.6 | 34.5 | 32.2 | 451 | 608 |
| 15 | Expansive Agent Used in Experiment No. 13 Dextrin Same as that Used in Experiment No. 14. | 40.7 | 36.1 | 32.0 | 28.5 | 448 | 595 |
| 16 | Expansive Agent Used in Experiment No. 12 Dextrin Having Cold Water Solubility of 95 wt % | 42.7 | 39.2 | 35.8 | 33.0 | 400 | 583 |
| 17 | Expansive Agent Used in Experiment No. 12 Dextrin Having Cold-water Solubility of 0 wt % | 40.1 | 36.9 | 33.0 | 30.0 | 438 | 571 |

TABLE 6

| | | Experiment No. | | | | | | | |
|---|---|---|---|---|---|---|---|---|---|
| | | 18 | 19 | 20 | 14* | 21 | 22 | 23 | 24 |
| Added Quantity (wt %) | | 0.05 | 0.1 | 0.2 | 0.6 | 1.5 | 2 | 2.5 | 3 |
| Maximum Temp. and Age | Temp. (°C.) | 59.4 | 57.4 | 56.0 | 55.2 | 54.1 | 52.8 | 52.3 | 52.2 |
| | Age (hr.) | 15 | 15 | 15 | 15 | 20 | 25 | 30 | 45 |
| Compressive Strength (kg/cm²) | 7 Days | 441 | 448 | 450 | 451 | 450 | 446 | 432 | 389 |
| | 28 Days | 581 | 592 | 603 | 608 | 605 | 593 | 587 | 578 |

Note:
(1) Number attached with * indicates the composition of Experiment No. 14 set forth in Table 5.
(2) The cold-water solubilities of the dextrins used in Experiment Nos. 18 to 24 are 18.3% by weight similarly as in the preceding Experiment.

As will be apparent from the results set forth above, the maximum temperatures in Experiment Nos. 14 and 19 to 23 according to the present invention were about 52° C. to about 57° C. and the maximum compressive strength reached 608 kg/cm². However, if the added amount of dextrin is in short of 0.1% by weight as is the case of Experiment No. 18, the maximum temperature raised to 59.4° C., the temperature suppressing effect being not exhibited and the compressive strength being not increased. On the other hand, if the added amount exceeds 2.5% by weight as is the case of Experiment No. 24, the strength development was too late as 578 kg/cm² at the age of 28 days although the temperature suppressing effect is exhibited.

Example 4

A concrete was prepared by mixing 90 parts by weight of a normal Portland cement, 10 parts by weight of a commercially available expansive agent mainly composed of calcium sulfoaluminate (sold under the Trade Name of "DENKA CSA"), 352 parts by weight of a coarse aggregate consisting of a river gravel having a grain size of less than 25 mm and 225 parts by weight of a fine aggregate consisting of a river sand having a particle size of less than 5 mm. The concrete was kneaded at the water-cement ratio of 56%, to which was added a dextrin having a cold-water solubility of 18.3% by weight, and then adjusted to a temperature of 20° C. after kneaded. The concrete was casted into an iron mold frame of 50 cm × 50 cm × 50 cm in dimension which was enclosed with a 10 cm thick foamed polystyrene on its four faces while the residing two faces being left opened, and the temperature at the substantial center portion of the concrete during the curing at 20° C. in a constant temperature chamber was measured by a thermo-couple automatically.

Figure 4:
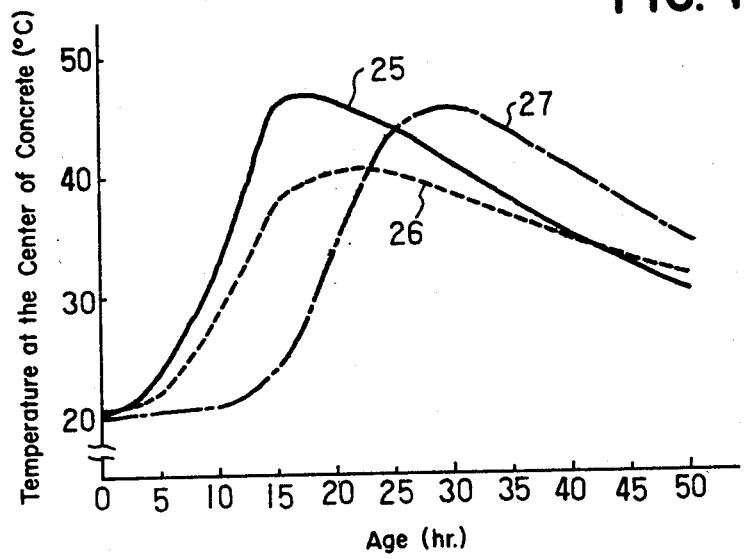
FIG. 4 is a graph similar to that shown in FIG. 2 showing the case of an expansive cement.

For the comparison purpose, similar tests were conducted on the concretes, respectively, added with no additive and gluconic acid. The results are shown in Table 7 and FIG. 4.

TABLE 7

| Experiment No. | Material Added | Temperature at the Substantial Center of the Concrete at Respective Ages (hour) (°C.) | | | | | | | | | | |
|---|---|---|---|---|---|---|---|---|---|---|---|---|
| | | 0 | 5 | 10 | 15 | 20 | 25 | 30 | 35 | 40 | 45 | 50 |
| 25 | Not Added | 20.3 | 23.6 | 32.5 | 45.6 | 46.2 | 44.0 | 40.8 | 37.7 | 34.9 | 32.3 | 30.2 |
| 26 | Dextrin 0.8 parts by weight | 20.4 | 22.0 | 28.8 | 37.8 | 40.2 | 40.0 | 38.3 | 36.5 | 34.5 | 32.8 | 31.5 |
| 27 | Gluconic Acid 0.15 parts by weight | 20.0 | 20.5 | 20.8 | 24.0 | 34.0 | 43.6 | 45.4 | 43.2 | 40.3 | 37.2 | 34.2 |

Example 5

Figure 5:
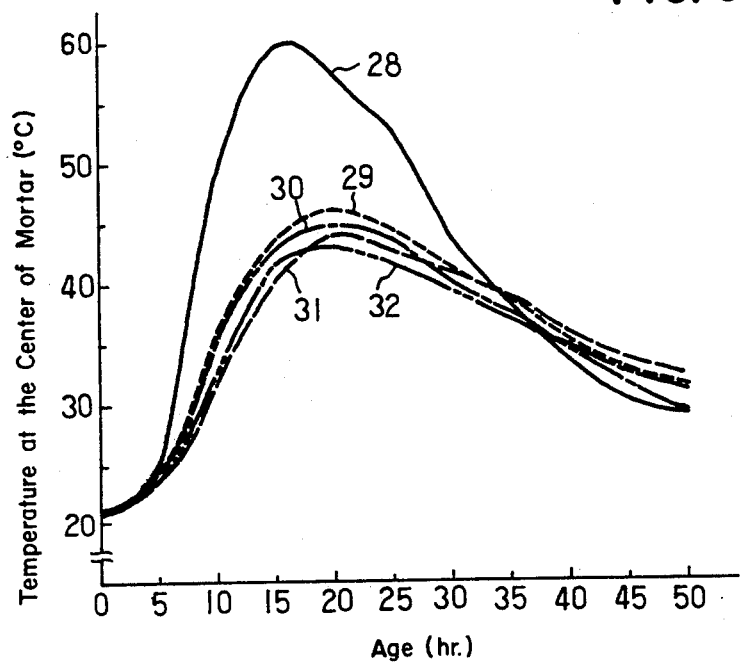
FIG. 5 is a graph similar to that shown in FIG. 1 showing the case wherein a surface active agent is added.

A mortar composed of 100 parts by weight of a normal Portland cement, 200 parts by weight of a river sand having a particle size of less than 5 mm, 0.4 parts by weight of a dextrin having a cold-water solubility of 18.3% by weight and each of the parts by weight of commercially available surface active agents as set forth in Table 8 was prepared, and adjusted the water-cement ratio of the mortar to 42% and the temperature after kneading to 20° C. About 3.5 liters of the thus prepared mortar was casted into a cylindrical container made of a foamed polystyrene and having a height of 30 cm, an inner diameter of 13 cm and a thickness of 10 cm, and cured at 20° C. in a constant temperature chamber. The temperature at the substantial center portion of the mortar during curing was measured automatically by a thermo-couple. The results are shown in Table 8 and FIG. 5.

There are also shown the results of the compressive strength tests conducted on the test specimens of 4 cm × 4 cm × 16 cm made of the same mortar which were cured at 20° C. in water in this Table.

Experiment Nos. 29 to 32 are the examples of the present invention.

TABLE 8

| Exp. No. | Material Added (part by weight) | | Temperature at the Substantial Center of the Mortar at Respective Ages (hour) (°C.) | | | | | | |
|---|---|---|---|---|---|---|---|---|---|
| | | | 0 | 5 | 10 | 15 | 20 | 25 | 30 |
| 28 | Not Added | | 21.0 | 25.0 | 49.0 | 59.8 | 57.1 | 52.6 | 43.6 |
| 29 | Dextrin 0.4 Water Reducing Agent Mainly Composed of Oxycarboxylate (Sold under the Trade Name of "PALIC" from Fujisawa Pharmaceutical Company Limited) | 0.2 | 20.8 | 24.3 | 35.8 | 43.8 | 46.2 | 44.4 | 41.3 |
| 30 | Dextrin 0.4 Air Entraining Water Reducing Agent Mainly Composed of lignin sulfonate (Sold under the Trade Name of "POZZOLITH NO 5L" from Nisso Master Builders Co., Ltd.) | 0.25 | 20.9 | 24.3 | 35.6 | 42.8 | 44.9 | 43.6 | 40.1 |
| 31 | Dextrin 0.4 Water Reducing Agent Mainly Composed of Polyalkylaryl Sulfonate (Sold under the Trade Name of "MIGHTY 150" from Kao Soap Co., Ltd.) | 0.25 | 21.2 | 23.8 | 31.8 | 40.0 | 44.0 | 42.7 | 41.0 |
| 32 | Dextrin 0.4 Air Entraining Agent Mainly Composed of Abietate (Sold under the Trade Name of "VINSOL" from Chemicals Co., Ltd.) | 0.02 | 20.9 | 23.8 | 32.8 | 41.6 | 43.0 | 41.7 | 39.4 |

| Exp. No. | Material Added (part by weight) | | Temperature at the Substantial Center of the Mortar at Respective Ages (hour) (°C.) | | | | Compressive Strength (kg/cm$^2$) | |
|---|---|---|---|---|---|---|---|---|
| | | | 35 | 40 | 45 | 50 | 7 days | 28 days |
| 28 | Not Added | | 38.3 | 33.5 | 30.1 | 29.2 | 461 | 572 |
| 29 | Dextrin 0.4 Water Reducing Agent Mainly Composed of Oxycarboxylate (Sold under the Trade Name of "PALIC" From Fujisawa Pharmaceutical Company Limited) | 0.2 | 38.8 | 35.2 | 32.8 | 31.5 | 470 | 589 |
| 30 | Dextrin 0.4 Air Entraining Water Reducing Agent Mainly Composed of lignin sulfonate (Sold under the Trade Name of "POZZOLITH NO 5L" from Nisso Master Builders Co., Ltd.) | 0.25 | 37.5 | 34.5 | 31.5 | 29.3 | 469 | 592 |
| 31 | Dextrin 0.4 Water Reducing Agent Mainly Composed of Polyalkylaryl Sulfonate (Sold under the Trade Name of "MIGHTY 150" from Kao Soap Co., Ltd) | 0.25 | 38.9 | 35.8 | 33.6 | 32.2 | 469 | 598 |
| 32 | Dextrin 0.4 Air Entraining Agent Mainly Composed of Abietate (Sold under the Trade Name of "VINSOL" from Yamaso Chemicals Co., Ltd.) | 0.02 | 37.0 | 34.6 | 32.4 | 31.0 | 469 | 585 |

EXAMPLE 6

Figure 6:
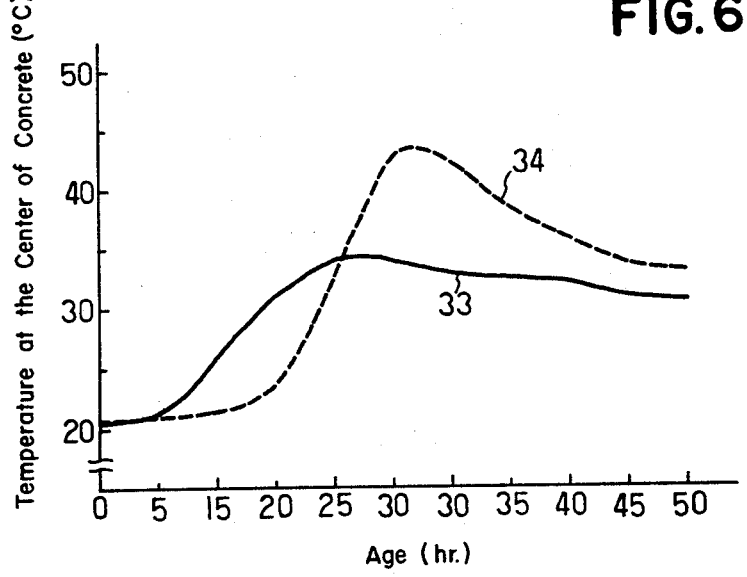
FIG. 6 is a graph similar to that shown in FIG. 2 showing the case wherein a surface active agent is added.

A concrete was prepared by mixing 100 parts by weight of a normal Portland cement, 352 parts by weight of a coarse aggregate consisting of a river gravel having a grain size of less than 25 mm, 255 parts by weight of a fine aggregate consisting of a river sand having a particle size of less than 5 mm and each of the parts by weight of additives as set forth in Table 9. The concrete was kneaded at the water-cement ratio of 56% and the temperature after kneading was adjusted at 20° C. The concrete was casted into an iron mold frame of 50 cm×50 cm×50 cm in dimension which was enclosed with a 10 cm thick foamed polystyrene on its four faces while the residing two faces being left opened, and the temperature at the substantial center portion of the concrete during the curing at 20° C. in a constant temperature chamber was measured by a thermo-couple automatically. The results are shown in Table 9 and FIG. 6. The cold-water solubility of the used dextrin was 18.3% by weight. Experiment No. 33 is an example of the present invention.

TABLE 9

| Exp. No. | Material Added (part by weight) | Temperature at the Substantial Center of the Concrete at Respective Ages (hour) (°C.) | | | | | | | | | | |
|---|---|---|---|---|---|---|---|---|---|---|---|---|
| | | 0 | 5 | 10 | 15 | 20 | 25 | 30 | 35 | 40 | 45 | 50 |
| 33 | Dextrin 0.4 Water Reducing Agent Mainly Composed of | 20.6 | 21.2 | 26.0 | 31.0 | 34.1 | 33.8 | 32.8 | 32.5 | 32.1 | 30.9 | 30.5 |

TABLE 9-continued

| Exp. No. | Material Added (part by weight) | Temperature at the Substantial Center of the Concrete at Respective Ages (hour) (°C.) | | | | | | | | | | |
|---|---|---|---|---|---|---|---|---|---|---|---|---|
| | | 0 | 5 | 10 | 15 | 20 | 25 | 30 | 35 | 40 | 45 | 50 |
| 34 | Polyalkylaryl Sulfonate (Sold under the Trade Name of "MIGHTY 150") 0.25 Gluconic Acid 0.15 | 20.7 | 20.9 | 21.3 | 23.5 | 33.2 | 42.7 | 42.2 | 38.4 | 35.9 | 33.6 | 33.0 |

While the present invention has been described with reference to the specific examples thereof, it should not be limited only to these presently preferred examples. It is intended that all changes and modifications which will be easily made by those skilled in the art and fall within the scope of the present invention shall be interpreted as being covered by the appended claims.

What is claimed is:

1. A cement composition for suppressing temperature rise due to heat of hydration, comprising
   a cement,
   0.1 to 2.5% by weight, based on the weight of said cement, of a dextrin having a cold-water solubility of from 10 to 80% by weight, and
   0.02 to 1% by weight, based on the weight of said cement, of a surface active agent selected from the group consisting of water reducing agents, air entraining water reducing agents, and air entraining agents and mixtures thereof.

2. A cement composition according to claim 1, wherein said cement is selected from the group consisting of Portland cements, mixed cements, expansive cements and rapid hardening cements and mixtures thereof.

3. A cement composition according to claim 2, wherein said cement is any one of the Portland cement selected from the group consisting of normal Portland cement, high early strength Portland cement, super high early strength Portland cement, moderate heat Portland cement and white Portland cement and mixtures thereof.

4. A cement composition according to claim 2, wherein said cement is a mixed cement selected from the group consisting of silica cement, fly ash cement and blast furnace cement and mixtures thereof.

5. A cement composition according to claim 2, wherein said cement is an expansive cement containing an expansive agent principally selected from the group consisting of a combination of calcium sulfoaluminate, lime and calcium sulfate, a combination of calcium aluminate and calcium sulfate, a high sulfate slag, lime and MgO and mixtures thereof.

6. A cement composition according to claim 2, wherein said cement is a rapid hardening cement containing 12CaO.7Al$_2$O$_3$ and/or 11CaO.7Al$_2$O$_3$.CaX$_2$(X being a halogen), and calcium sulfate.

7. A cement composition according to claim 1, wherein said air entraining water reducing agent is principally composed of a surface active agent selected from the group consisting of a lignin sulfonate, a creosote oil-formaldehyde condensate modified with a salt of sulfurous acid, a metal salt of naphthalene sulfurous acid-formaldehyde condensate, and a polyoxyethylene alkylaryl ether and mixtures thereof.

8. A cement composition according to claim 1, wherein said air entraining agent is principally composed of a surface active agent selected from the group consisting of sodium abietate and a triethanolammonium hydrocarbon sulfonate and mixtures thereof.

9. A cement composition according to claim 1, further comprising a retarder.

10. A cement composition according to claim 9, wherein said retarder is selected from the group consisting of carbohydrates, high molecular weight organic acids, carboxylic acids and salts thereof, higher and lower alcohols and inorganic acids and salts thereof and mixtures thereof.

11. A cement composition according to claim 2, wherein said cement is an expansive cement.

12. A cement composition according to claim 1, wherein said water-reducing agent is principally composed of a surface active agent selected from the group consisting of a polysaccharide, an oxycarboxylate, a polyalkylaryl sulfonate, and a polycondensation product of triazine modified with an alkali metal salt of sulfurous acid and mixtures thereof.

* * * * *